US008936846B2

(12) United States Patent
Depta et al.

(10) Patent No.: US 8,936,846 B2

(45) Date of Patent: Jan. 20, 2015

(54) LAYER-TYPE VALUE DOCUMENT COMPRISING AN INK MIXTURE IN ONE LAYER

(75) Inventors: Georg Depta, Rosenheim (DE); Christof Baldus, Munich (DE); Karlheinz Mayer, Augsburg (DE); Peter Schiffmann, Freising (DE)

(73) Assignee: Giesecke & Devrient GmbH, Munich (DE)

( * ) Notice: Subject to any disclaimer, the term of this patent is extended or adjusted under 35 U.S.C. 154(b) by 2169 days.

(21) Appl. No.: 11/568,538

(22) PCT Filed: Apr. 5, 2005

(86) PCT No.: PCT/EP2005/003577

§ 371 (c)(1), (2), (4) Date: Sep. 23, 2008

(87) PCT Pub. No.: WO2005/108110

PCT Pub. Date: Nov. 17, 2005

(65) Prior Publication Data

US 2009/0008926 A1 Jan. 8, 2009

(30) Foreign Application Priority Data

May 5, 2004 (DE) ......................... 10 2004 022 080

(51) Int. Cl.

*B32B 3/00* (2006.01)
*B32B 5/16* (2006.01)
*B42D 15/00* (2006.01)

(52) U.S. Cl.

CPC ........ *B42D 15/0013* (2013.01); *B42D 2031/08* (2013.01); *B42D 2031/16* (2013.01); (Continued)

(58) Field of Classification Search

CPC .......... B41M 3/00; B41M 3/148; B41M 3/14; B42D 15/105; B42D 15/0013; B42D 2031/08; B42D 2013/16; B42D 2013/20; B42D 2035/24; B42D 2035/38; B42D 2035/44; B42D 2035/12; B42D 2035/20; B42D 2035/30; B42D 15/10; B42D 2031/20; B42D 2033/04; B42D 2033/08; B42D 2033/24; B42D 2035/08; C09C 1/0024; C09C 2200/1004; C09C 2200/102; C09C 2200/301; C09C 2200/302; C09C 2200/303; C09C 2220/106; C09D 5/36; Y10S 283/901; Y10S 283/902; Y10S 428/916

USPC ................................................ 283/94; 430/10

See application file for complete search history.

(56) References Cited

U.S. PATENT DOCUMENTS 4,523,777 A 6/1985 Holbein et al.
4,732,410 A 3/1988 Holbein et al.

(Continued)

FOREIGN PATENT DOCUMENTS

DE 03048733 7/1982
DE 03738330 5/1988

(Continued)

OTHER PUBLICATIONS

International Search Report, International Application No. PCT/EP2005/003577, 4 pages, Jul. 11, 2005.

(Continued)

*Primary Examiner* — Mark Ruthkosky
*Assistant Examiner* — Laura C Powers
(74) *Attorney, Agent, or Firm* — Lathrop & Gage LLP

(57) ABSTRACT

The invention relates to a value document, especially a banknote, having a sequence of layers into which visually and/or mechanically perceptible identifiers in the form of patterns, letters, numbers or images are introduced by the action of laser radiation. According to the present invention, the sequence of layers includes a marking layer (22) composed of an ink mixture (24, 26) exhibiting a laser-radiation-absorbing mixture component (26) and a laser-radiation-transparent mixture component (24), the identifiers being visually and/or mechanically perceptible due to an irreversible change in the optical properties of the ink mixture (24, 26), effected by the action of the laser radiation.

28 Claims, 9 Drawing Sheets

Figure 1:
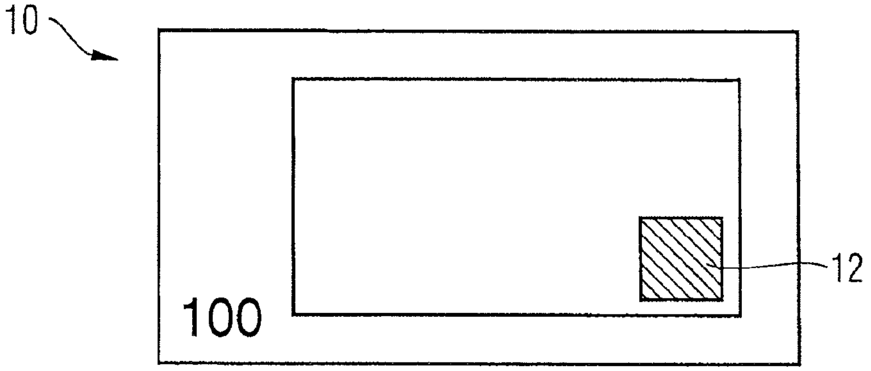

(52) U.S. Cl.
CPC ......... *B42D2033/20* (2013.01); *B42D 2035/24* (2013.01); *B42D 2035/38* (2013.01); *B42D 2035/44* (2013.01)
USPC ................................ 428/204; 283/94; 430/10

(56) References Cited

U.S. PATENT DOCUMENTS

| | | | | |
|---|---|---|---|---|
| 4,861,620 | A | 8/1989 | Azuma et al. | |
| 5,298,922 | A * | 3/1994 | Merkle et al. | 347/232 |
| 5,304,789 | A | 4/1994 | Lob et al. | |
| 5,774,168 | A | 6/1998 | Blome | |
| 6,179,338 | B1 | 1/2001 | Bergmann et al. | |
| 6,905,755 | B1 * | 6/2005 | Nemeth | 428/195.1 |
| 7,040,663 | B1 * | 5/2006 | Plaschka et al. | 283/72 |
| 7,077,897 | B2 * | 7/2006 | Brueckner et al. | 106/415 |
| 2004/0022967 | A1 | 2/2004 | Lutz et al. | |
| 2004/0126503 | A1 * | 7/2004 | Kuntz et al. | 427/555 |
| 2006/0145468 | A1 | 7/2006 | Plaschka et al. | |
| 2007/0165182 | A1 | 7/2007 | Hoffmuller | |
| 2007/0211238 | A1 | 9/2007 | Hoffmuller | |
| 2007/0216518 | A1 | 9/2007 | Hoffmuller | |
| 2007/0229928 | A1 | 10/2007 | Hoffmuller | |
| 2007/0241551 | A1 | 10/2007 | Graff | |
| 2007/0246933 | A1 | 10/2007 | Heim | |
| 2007/0274559 | A1 | 11/2007 | Depta | |
| 2008/0014378 | A1 | 1/2008 | Hoffmuller | |
| 2008/0054621 | A1 | 3/2008 | Burchard | |
| 2008/0079257 | A1 | 4/2008 | Fessl | |
| 2008/0088859 | A1 | 4/2008 | Depta | |
| 2008/0160226 | A1 | 7/2008 | Kaule | |
| 2008/0163994 | A1 | 7/2008 | Hoppe | |
| 2008/0198468 | A1 | 8/2008 | Kaule | |
| 2008/0216976 | A1 | 9/2008 | Ruck | |
| 2008/0250954 | A1 | 10/2008 | Depta | |
| 2008/0258456 | A1 | 10/2008 | Rahm | |
| 2009/0001709 | A1 | 1/2009 | Kretschmar | |
| 2009/0008923 | A1 | 1/2009 | Kaule | |

FOREIGN PATENT DOCUMENTS

| | | | |
|---|---|---|---|
| EP | 0481388 | | 6/1997 |
| EP | 0710184 | | 7/1998 |
| WO | WO 0050249 | A1 * | 8/2000 |
| WO | WO 0103951 | A1 * | 1/2001 |
| WO | WO 0233010 | A1 * | 4/2002 |
| WO | WO 03/039888 | | 5/2003 |
| WO | WO 03/095225 | | 11/2003 |
| WO | WO 2004/009371 | | 1/2004 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006040069 | | 4/2006 |
| WO | WO 2006056342 | | 6/2006 |
| WO | WO 2006072380 | | 7/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007006445 | | 1/2007 |
| WO | WO 2007006455 | | 1/2007 |
| WO | WO 2007076952 | | 7/2007 |
| WO | WO 2007079851 | | 7/2007 |
| WO | WO 2007115648 | | 10/2007 |

OTHER PUBLICATIONS

International Preliminary Report on Patentability, International Application No. PCT/EP2005/003577, 10 pages.
U.S. Appl. No. 11/568,538 filed Sep. 23, 2008, Depta.
U.S. Appl. No. 11/719,843 in pre-exam, Kaule.
U.S. Appl. No. 11/995,227 in pre-exam, Gruszczynski.
U.S. Appl. No. 12/294,222 in pre-exam, Hoffmuller.

* cited by examiner

LAYER-TYPE VALUE DOCUMENT COMPRISING AN INK MIXTURE IN ONE LAYER

CROSS-REFERENCE TO RELATED APPLICATIONS

This application is the National Stage of International Application No. PCT/EP2005/003577, filed Apr. 5, 2005, which claims the benefit of German Patent Application DE 10 2004 022 080.8, filed May 5, 2004, both of which are hereby incorporated by reference to the extent not inconsistent with the disclosure herewith.

The invention relates to a value document, especially a banknote, having a sequence of layers into which visually and/or mechanically perceptible identifiers in the form of patterns, letters, numbers or images are introduced by the action of laser radiation. The invention also relates to a security element for value documents having such a sequence of layers, as well as a method for manufacturing such value documents or security elements.

Identity cards, such as credit cards or personal identification cards, have long been personalized by means of laser engraving. In personalization by laser engraving, the optical properties of the card material are irreversibly changed in the form of a desired identifier through suitable guidance of a laser beam. For example, in publication DE 30 48 733 A1 is described an identity card having applied information and exhibiting, on one surface, differing colored layer areas that are disposed on top of one another and that are at least partially interrupted by visually perceptible personalization data.

In general, value documents, such as banknotes, stocks, bonds, certificates, vouchers, checks, admission tickets and the like, are provided with an individualization mark, such as a serial number.

Based on that, the object of the present invention is to propose a value document of the kind mentioned above, exhibiting laser-generated identifiers of high counterfeit security. To further increase the security and perceptibility, the identifiers should especially be associated with additional optical effects that are difficult to imitate.

This object is solved by the value document and the security element having the features of the independent claims. Methods for manufacturing the same are specified in coordinated claims. Developments of the present invention are the subject of the dependent claims.

According to a first aspect of the present invention, the sequence of layers of the value document contains a marking layer composed of an ink mixture exhibiting a laser-radiation-absorbing mixture component and a laser-radiation-transparent mixture component. Here, the identifiers are visually and/or mechanically perceptible due to an irreversible change in the optical properties of the ink mixture, effected by the action of the laser radiation. In the context of the present description, the term "sequence of layers" refers to a sequence of at least one, but normally more layers disposed on top of and/or next to one another. The term "optical properties" covers primarily a material's properties for absorbing and reflecting optical radiation (ultraviolet, visible or infrared radiation), but also other specific responses to the incidence of optical radiation, such as fluorescence or phosphorescence emission.

As described in detail below, under the action of the laser radiation, the absorbing mixture component can, for example, be bleached, vaporized, changed in its reflection properties or transformed by a chemical reaction into a material having other optical properties.

In a preferred version of the invention, the introduced identifiers are visually perceptible without auxiliary means. This means that no particular equipment is required to illuminate or view the identifiers, but rather, they are perceptible to the unaided eye under normal ambient conditions.

The ink mixture preferably contains optically variable color pigments, especially optically variable liquid crystal pigments or a transparent or translucent intaglio ink being able to be used as the laser-radiation-transparent mixture component, and, for example, optically variable interference layer pigments as the absorbing mixture component. Other ink components that are irreversibly changeable in their optical properties, such as an intaglio ink, a metallic ink or metallic pigments, a luminescent ink or luminescent pigments, glossy pigments or a thermochromic ink, may also be used as the absorbing mixture component.

It is also possible that the optical properties of the absorbing mixture component are not changed, but rather that the ink mixture contains a ink component that coacts with the absorbing mixture component and whose optical properties are indirectly irreversibly changed, namely through the absorption of the laser radiation in the absorbing mixture component, particularly the local temperature rise caused thereby in the marking layer.

Particularly ink components that themselves are non-absorbing, such as certain intaglio inks, luminescent inks or luminescent pigments, glossy pigments or thermochromic inks may be used as such a coacting ink component. As the absorbing mixture component, the ink mixture contains, for example, soot, graphite, $TiO_2$ or an infrared absorber.

In a preferred embodiment of the present invention, the sequence of layers exhibits at least one laser-radiation-absorbing layer that is disposed between the marking layer and the substrate of the value document. In a further preferred embodiment, the sequence of layers exhibits at least one laser-radiation-absorbing layer and at least one laser-radiation-transparent layer, both of which are disposed between the marking layer and the substrate of the value document.

Here, a laser-radiation-transparent layer is preferably disposed between the absorbing layer and the marking layer. It is likewise advantageous for a(n) (additional) laser-radiation-transparent layer to be disposed between the absorbing layer and the substrate of the value document.

According to an advantageous development of the present invention, one or more of the absorbing or transparent layers are structured to bear information. Here, the structurings are preferably at least partially produced with printing technology. It is likewise preferred when the information-bearing structurings are at least partially produced by the action of the laser radiation, especially by a selective ablation of an absorbing layer. Here, particularly advantageously, printing-technology structuring and laser ablation can coact and complement each other to produce particular effects that are practically not reproducible with printing technology alone, such as the register effects described below.

In a further advantageous embodiment, the sequence of layers contains, in addition to the marking layer, an additional layer composed of an ink mixture that exhibits a laser-radiation-absorbing mixture component and a laser-radiation-transparent mixture component. Here, the additional ink mixture layer is disposed between the marking layer and the substrate of the value document. Preferably, the additional ink mixture layer exhibits an ink mixture of the kind described above for the marking layer. If appropriate, the additional ink mixture layer is structured with printing technology to bear information.

After the laser impingement on the sequence of layers, only the transparent mixture component remains, also in the additional ink mixture layer. This embodiment can thus serve as an alternative to a layering of a transparent and an absorbing layer as the substrate for the marking layer. Here, too, namely, a colored substrate becomes visible through the action of the laser radiation, and a printing layer and thus a process step can be saved. For the additional ink mixture layer, ink mixtures such as those used for offset or nyloprint printing are also suitable, if appropriate with additional effect components. For example, a black mixture composed of absorbing Milori blue, red and yellow can be employed. Through the action of the laser radiation, the blue is selectively removed and an orange tone remains.

In all of the embodiments described, the information-bearing structurings advantageously form at least part of the identifiers, and are visually perceptible due to the irreversible change in the optical properties of the ink mixture. For example, the information-bearing structurings are introduced through printing technology into various printing layers, which are coated by an originally opaque or merely translucent marking layer. Through the laser action, the marking layer becomes transparent in areas, or is even removed, so that the underlying structurings become perceptible.

In another, likewise preferred version of the present invention, the introduced identifiers are not visually perceptible, or at least not without auxiliary means. This means that, for example, special illumination equipment or special viewing equipment is required for the detection of the identifiers, while the identifiers are substantially invisible to the unaided eye under normal ambient conditions. Such identifiers are employed particularly advantageously above all in banknotes or other data carriers constituting a value, since they are substantially invisible to the human eye, disrupt the design of the data carrier only mildly or not at all, they require little space on the data carrier and they constitute a security feature in and of themselves.

Preferably, the introduced identifiers are perceptible in the infrared spectral range. The identifiers can stand out from their surroundings, for example, in their IR reflectivity and in this way, upon irradiation with an infrared lamp, be detected and mechanically read out with an infrared detector.

In another advantageous design, the introduced identifiers are perceptible following irradiation with ultraviolet radiation. Here, for example, advantage can be taken of a different reflectivity in the ultraviolet spectral range, or luminescent substances that emit visible or infrared radiation following excitation with UV radiation can be provided.

The absorbing mixture component and the transparent mixture component preferably appear in the same tone in the visible spectral range, so that the identifier remains invisible to the naked eye without auxiliary means. Here, the ink mixture preferably visually exhibits a hue that differs from black, that is, it appears for example blue, green or red.

It has proven to be advantageous when the proportion of the transparent mixture component outweighs the proportion of the absorbing mixture component in the ink mixture. This makes it easy to achieve that the identifiers are not perceptible for the naked eye despite the sufficiently high feature contrast for mechanical detection. In particular, the transparent mixture component expediently exhibits a proportion of 60% or more, preferably of 70% or more, particularly preferably of 80% or more in the ink mixture.

In a second aspect of the present invention, the sequence of layers of the value document exhibits at least one laser-radiation-absorbing layer and at least one laser-radiation-transparent layer, at least one of the absorbing or transparent layers containing optically variable color pigments. In this embodiment, the identifiers are visually perceptible due to a selective ablation of the at least one absorbing layer, effected by the action of the laser radiation.

Here, advantageously, at least one of the absorbing or laser-radiation-transparent layers is structured to bear information, the information-bearing structurings being able to be at least partially produced with printing technology. Likewise advantageously, the information-bearing structurings can be at least partially produced by the action of the laser radiation, especially by a selective ablation of an (additional) absorbing layer. The optically variable color pigments are preferably formed by liquid crystal pigments or interference layer pigments.

According to a further aspect of the present invention, mechanically perceptible marks are introduced into a sequence of layers of a value document. In a first version of this aspect, the sequence of layers exhibits at least one laser-radiation-absorbing layer and at least one laser-radiation-transparent layer. Here, the absorbing layer and the transparent layer appear in the same tone in the visible spectral range, and the identifiers are mechanically perceptible due to a selective change in the absorbing layer, effected by the action of the laser radiation. However, they are not visually perceptible, or at least not perceptible without auxiliary means.

Also in this aspect of the invention, the introduced identifiers are preferably perceptible in the infrared spectral range or following irradiation with ultraviolet radiation. Advantageously, the absorbing layer and the transparent layer visually exhibit the same hue, differing from black.

Expediently, the laser-radiation-transparent layer exhibits a greater thickness than the absorbing layer, so that the identifiers remain invisible to the naked eye. Advantageously, the absorbing layer is disposed above the transparent layer, so that there is no danger of the transparent layer rupturing upon absorption of the marking radiation in the absorbing layer.

According to another version of this aspect of the present invention, the sequence of layers and the underlying value document substrate are designed to have the same tone in the visible spectral range. Here, the sequence of layers exhibits at least one laser-radiation-absorbing layer. As in the first version of this aspect of the present invention, due to a selective change in the absorbing layer, effected by the action of the laser radiation, the identifiers are mechanically perceptible but not visually perceptible, or at least not without auxiliary means. Likewise, the introduced identifiers are preferably perceptible in the infrared spectral range or following irradiation with ultraviolet radiation. The absorbing layer and the underlying value document substrate preferably visually exhibit a hue that differs from black.

In both versions, it can be provided that the absorbing layer is structured to bear information. Also a potentially provided transparent layer can be structured to bear information. Preferably, these information-bearing structurings are at least partially produced with printing technology. Likewise expedient is an embodiment in which the information-bearing structurings are at least partially produced by the action of the laser radiation, especially by a selective ablation of an absorbing layer. As in the first aspect of the present invention, particularly advantageously, printing-technology structuring and laser ablation can coact and complement each other to produce effects that are practically not reproducible with printing technology alone.

In all aspects and versions of the present invention, the identifiers can comprise an individualization mark for the value document, such as a sequential serial number, a symbol code, such as a bar or matrix code, or the like.

The invention also includes, for value documents, a security element that is provided with a sequence of layers according to one of the above-described aspects or versions of the present invention.

The invention further comprises a method for manufacturing a security element or a value document having a sequence of layers, in which a predefined laser wavelength is chosen, to a substrate or to a layer of the sequence of layers is applied a marking layer composed of an ink mixture exhibiting a mixture component that absorbs the laser radiation of the predefined laser wavelength, and a mixture component that is transparent to the laser radiation of the predefined laser wavelength, and through impingement on the sequence of layers by laser radiation of the predefined laser wavelength, identifiers are introduced into the sequence of layers in the form of patterns, letters, numbers or images that are visually and/or mechanically perceptible due to an irreversible change in the optical properties of the ink mixture, effected by the action of the laser radiation.

Here, advantageously, at least one laser-radiation-absorbing layer and, if appropriate, additionally a laser-radiation-transparent layer is applied, especially imprinted, between the marking layer and the substrate of the value document or security element.

In an additional method for manufacturing a security element or a value document having a sequence of layers, a predefined laser wavelength is chosen, to a substrate or to a layer of the sequence of layers are applied at least one layer that absorbs the laser radiation of the predefined laser wavelength and one layer that is transparent to the laser radiation of the predefined laser wavelength, at least one of the absorbing or transparent layers containing optically variable color pigments, and through impingement on the sequence of layers by laser radiation of the predefined laser wavelength, identifiers are introduced into the sequence of layers in the form of patterns, letters, numbers or images that are visually perceptible due to a selective ablation of the absorbing layer, effected by the action of the laser radiation.

In both of the method variations cited, advantageously, at least one of the absorbing or the laser-radiation-transparent layers is structured to bear information, the information-bearing structurings preferably being at least partially produced with printing technology. Likewise advantageously, the information-bearing structurings can be at least partially produced by the action of the laser radiation, especially by a selective ablation of an (additional) absorbing layer.

According to a further aspect, the invention includes a method for manufacturing a value document having a sequence of layers, in which a predefined laser wavelength is chosen, to a substrate or to a layer of the sequence of layers are applied at least one layer that absorbs the laser radiation of the predefined laser wavelength and one layer that is transparent to the laser radiation of the predefined laser wavelength, the transparent and the absorbing layer appearing in the same tone in the visible spectral range, and through impingement on the sequence of layers by laser radiation of the predefined laser wavelength, identifiers are introduced into the sequence of layers in the form of patterns, letters, numbers or images that, due to a selective change in the absorbing layer, effected by the action of the laser radiation, are mechanically perceptible but are not visually perceptible, or at least not without auxiliary means.

According to yet a further aspect, the invention includes a method for manufacturing a value document having a sequence of layers, in which a predefined laser wavelength is chosen, to the value document substrate is applied a sequence of layers that appears in the same tone in the visible spectral range and having at least one layer that absorbs the laser radiation of the predefined laser wavelength, and through impingement on the sequence of layers by laser radiation of the predefined laser wavelength, identifiers are introduced into the sequence of layers in the form of patterns, letters, numbers or images that, due to a selective change in the absorbing layer, effected by the action of the laser radiation, are mechanically perceptible but are not visually perceptible, or at least not without auxiliary means.

$CO_2$ lasers, Nd:YAG lasers, Nd:$YVO_4$ lasers or other laser types in the wavelength range from UV to far infrared may be used as the laser source, the lasers also often working advantageously with frequency doubling or tripling. Particularly advantageously, laser sources in the near infrared are employed, since this wavelength range is well suited to the absorption properties of the substrates and printing inks used for value documents. For example, it is easy to specify for this range printing inks that are transparent to the laser radiation, but opaque and colored in the visible spectral range to the human observer. Particularly advantageously, infrared lasers in the wavelength range from 0.8 μm to 3 μm, especially Nd:YAG lasers or Nd:$YVO_4$ lasers, are used.

With a Nd:YAG marking laser ($\lambda$=1,064 μm), for example, vectors can be inscribed in the sequence of layers, which is advantageous above all for fast inscriptions. For this, a Nd:YAG laser can be operated with a pulse frequency between 20 kHz and continuous wave, an output between 10 and 100 W, for example 50W, and a transverse speed between 3 and 30 m/s, preferably between 7 and 20 m/s. The working distance between the lens and the substrate is selected to be somewhat less than that required for optimum focussing, to achieve a slight defocussing of the laser spot.

In another example for introducing the identifiers, a Nd:$YVO_4$ marking laser (likewise $\lambda$=1,064 μm) is operated in raster mode, which is advantageous above all for illustrating and inscribing cards or data pages of passports. For this, the Nd:$YVO_4$ laser can be operated, for example, with a pulse frequency between 20 kHz and 80 kHz, an output between 0.5 and 4 W, and for a grid dot density between 250 and 4800 dpi. Here, too, the laser spot can be slightly defocussed.

Further exemplary embodiments and advantages of the present invention are explained below by reference to the drawings, in which a depiction to scale and proportion was omitted in order to improve their clarity.

Figure 2:
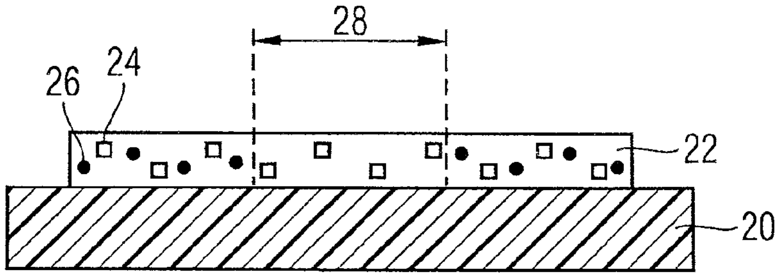
Figure 3:
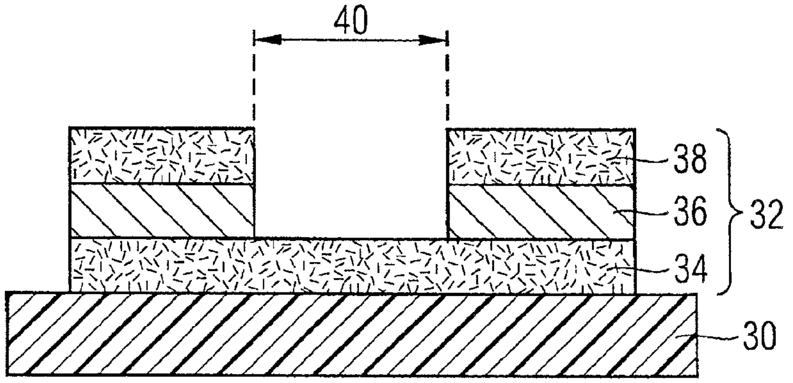
Figure 4A:
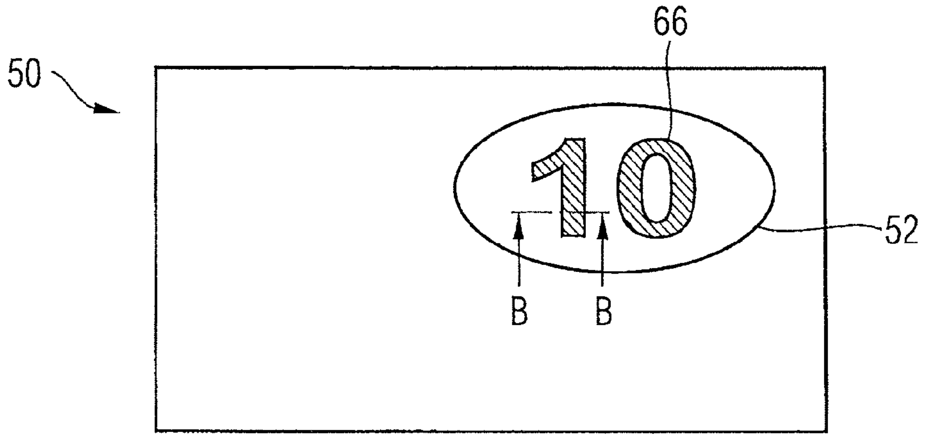
Figure 4B:
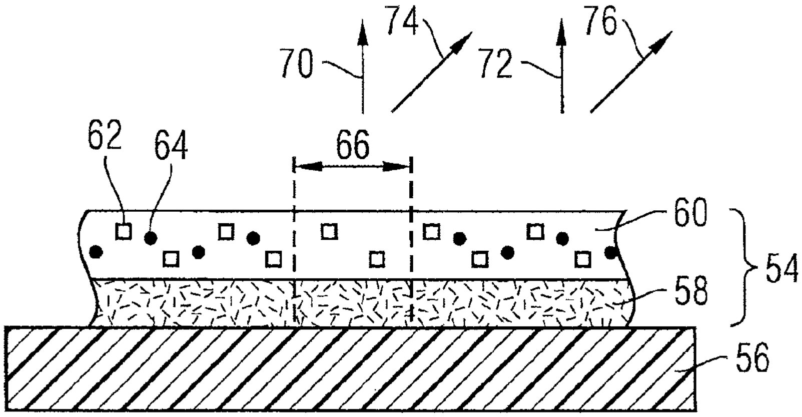
Figure 5A:
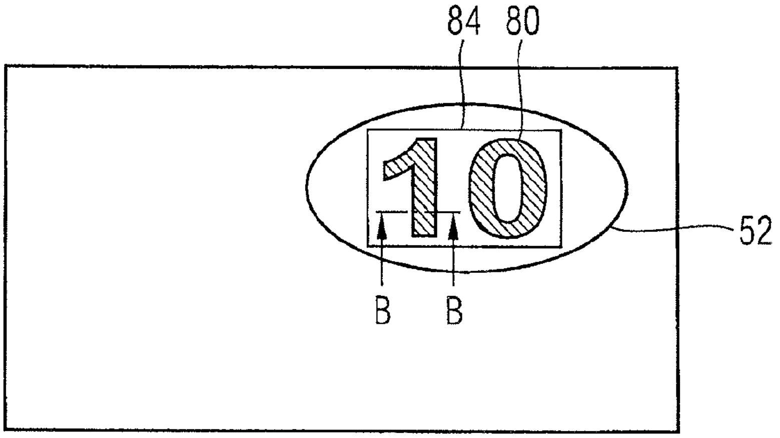
Figure 5B:
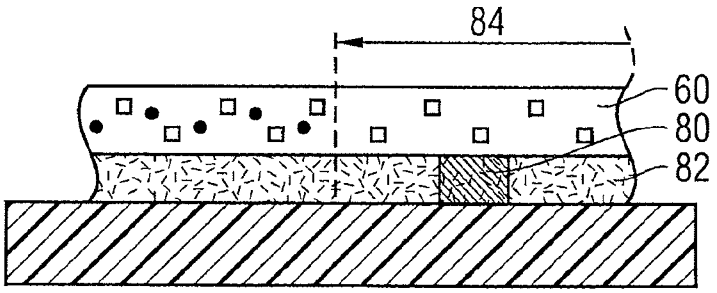
Figure 6A:
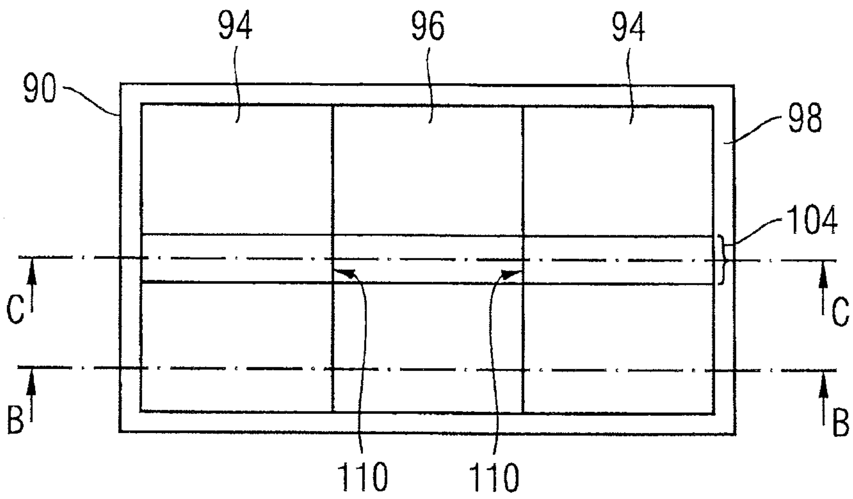
Figure 6B:
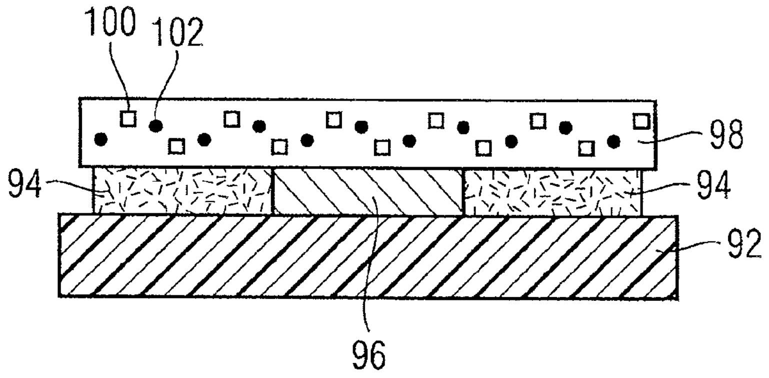
Figure 6C:
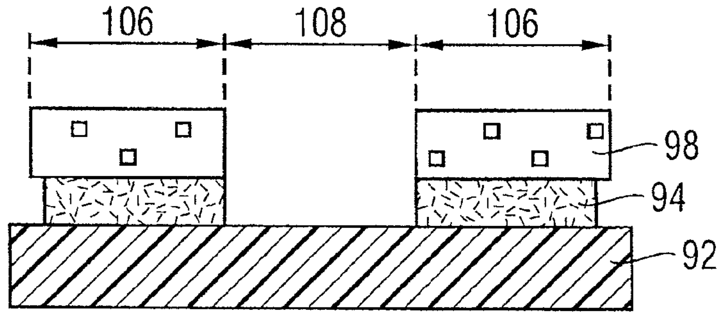
Figure 7A:
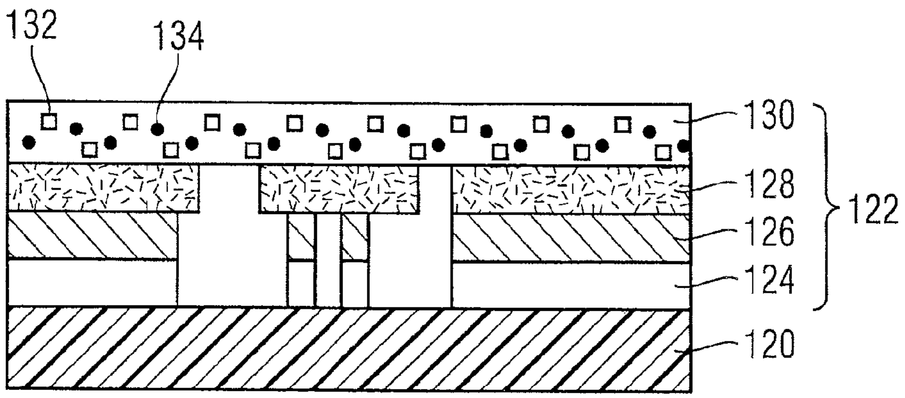
Figure 7B:
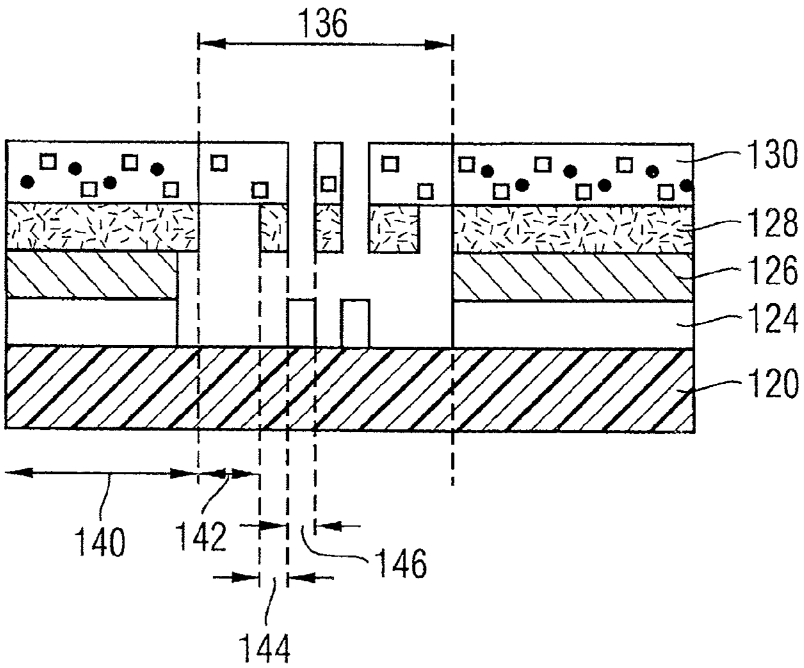
Figure 8A:
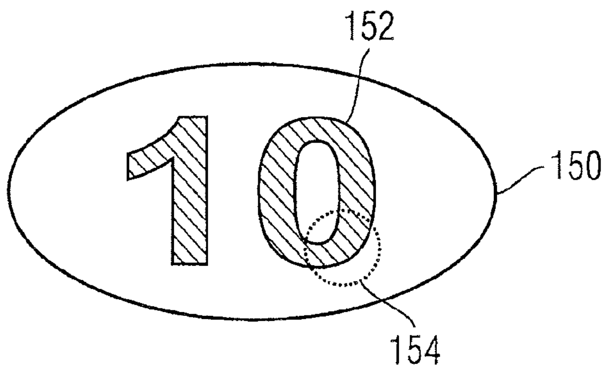
Figure 8B:
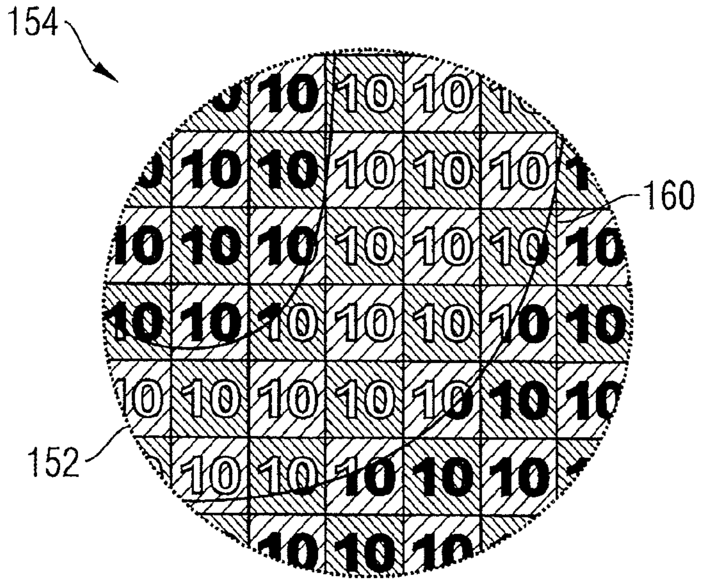
Figure 9:
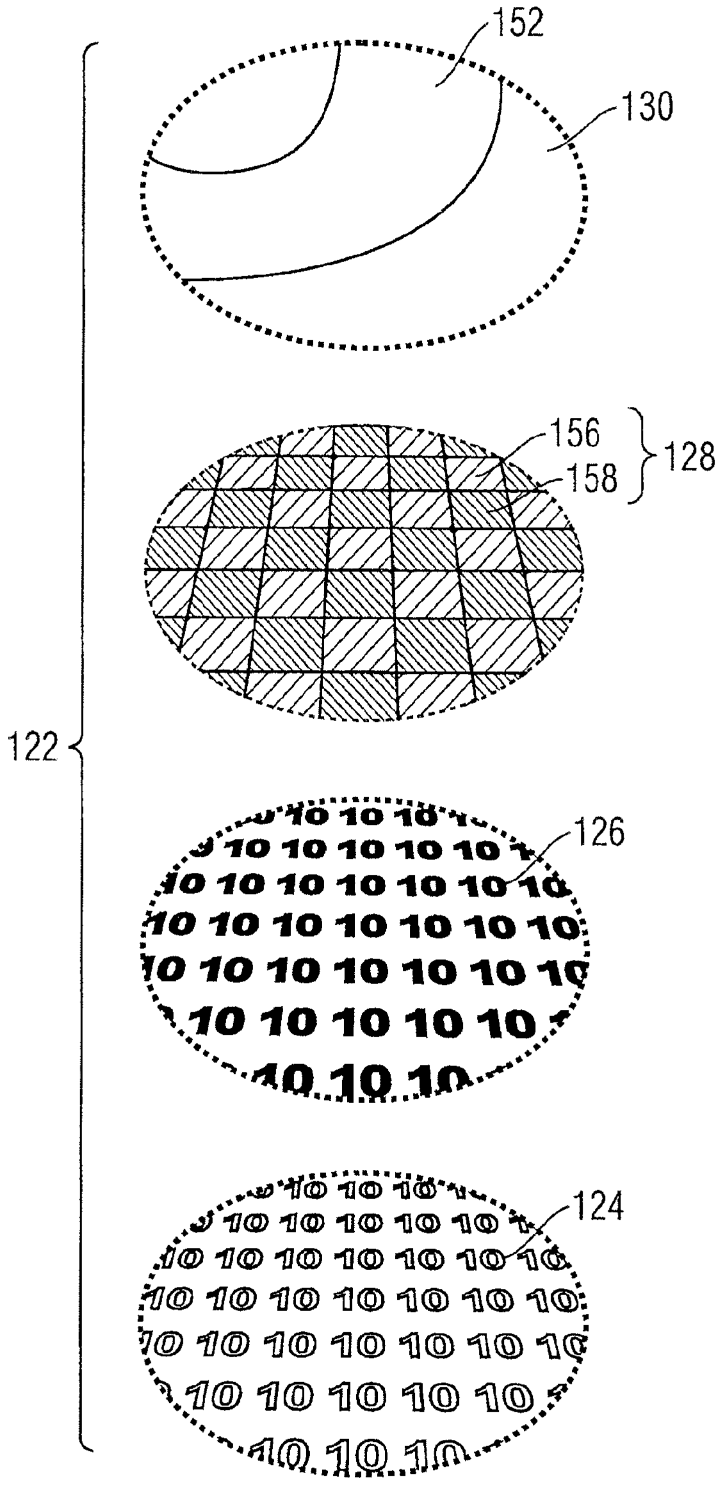
Figure 10:
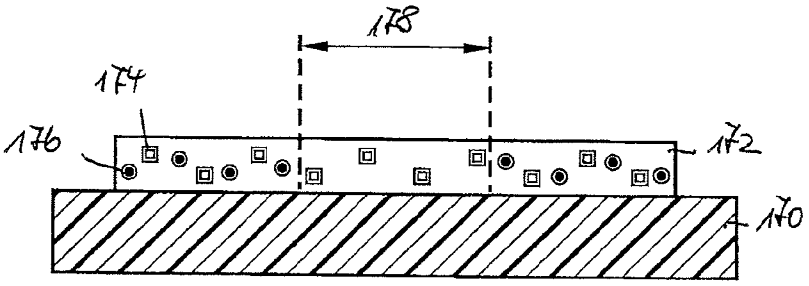
Figure 11:
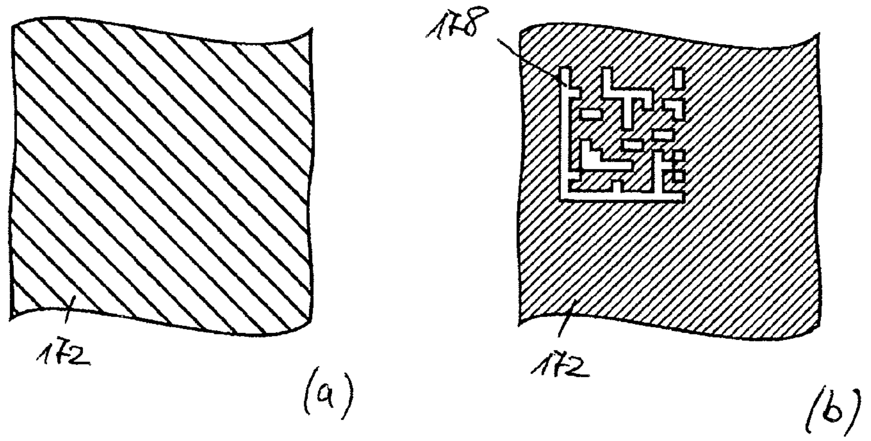
Figure 12:
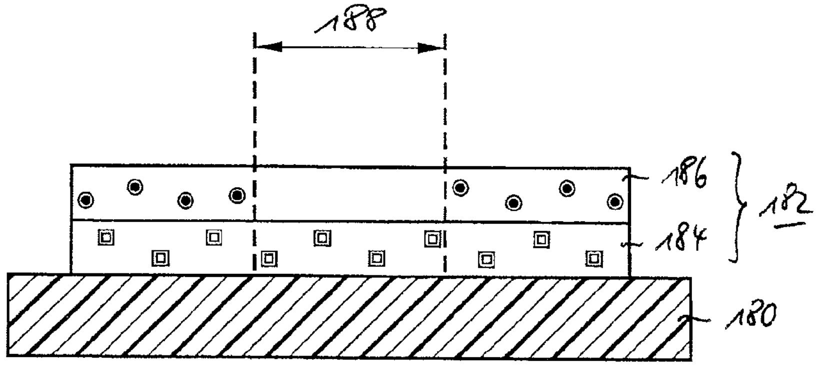
Figure 13:
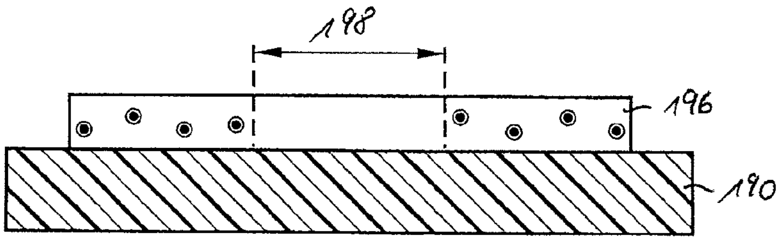

Shown are:

FIG. 1 a schematic diagram of a banknote having an identifier area designed according to the present invention, FIG. 2 a substrate having a marking layer that is changed in areas and is composed of an effect ink mixture, FIG. 3 a substrate having a selectively ablated sequence of absorbing and transparent layers, FIG. 4 a value document according to an exemplary embodiment of the present invention, in which, in (a), the identifier area of the document is shown as viewed from above and in (b), the layer structure is shown in a cross-sectional view along line B-B of (a), FIG. 5 a diagram as in FIG. 4 for another exemplary embodiment of the present invention, FIG. 6 a further exemplary embodiment of a value document showing a macroscopic register effect, FIG. 7 an exemplary embodiment of a value document having a microregister that is perceptible only under a magnifying glass, (a) showing the layer structure prior to laser impingement and (b) showing the marked sequence of layers after laser impingement has occurred, FIG. 8 in (a), the identifier area of the value document of FIG. 7 as viewed from above, and in (b), a section in the border region of the laser-impinged area, FIG. 9 in an exploded perspective view, the successive, printing-technology structured layers of the value document of FIGS. 7 and 8, FIG. 10 an exemplary embodiment of a value document having a mechanically detectable identifier that is not perceptible to the human eye without auxiliary means, FIG. 11 a section of the value document in FIG. 10, schematically as viewed from above, (a) showing the visual appearance and (b) showing the image from an IR camera upon illumination of the value document with an IR lamp, and FIGS. 12 and 13 further exemplary embodiments for value documents having a mechanically detectable identifier.

The invention will now be explained using a banknote as an example. FIG. 1 shows a schematic diagram of a banknote 10, onto whose front, in an identifier area 12, visually perceptible identifiers are introduced in the form of patterns, letters, numbers or images by the action of a laser beam. The identifiers can comprise, for example, the denomination of the banknote, a serial number, a signature or other text or graphic objects. The identifiers can also first have been formed on a transfer element that was then applied, especially affixed, to the banknote.

The basic principles of the identifiers according to the present invention will now be explained with reference to the cross-section views of FIGS. 2 and 3.

FIG. 2 shows a substrate 20, for example of a banknote or of another value document, on which a marking layer 22 composed of an ink mixture composed of two mixture components 24 and 26 is applied. One of the mixture components 24 is transparent to the radiation of the infrared laser subsequently used for marking, and the other mixture component 26 absorbs the laser radiation. In area 28, the marking layer 22 was irradiated with the marking laser with suitably chosen laser parameters to remove, change or deactivate the absorbing mixture component 26 through the action of the laser radiation.

Depending on the material used, the absorbing mixture component 26 can, for example, be bleached, vaporized, changed in its reflection properties or transformed by a chemical reaction into a material having other optical properties. Overall, the optical properties of the ink mixture in the area 28 are irreversibly altered by the irradiation. Possible effects that can be used include a color change, the production of a color alteration, the lightening of a color, the change of the tilt color of an effect ink mixture, or the local change of the polarization properties or the luminescence properties of the marking layer 22.

Due to the laser-induced change in the optical properties of the ink mixture, visually perceptible identifiers are created in the value document. These can be formed by the shape of the irradiated and modified areas 28 of the marking layer itself, or result only in coaction with additional printing layers, for example those structured to contain information.

For example, an information-bearing printing layer can be provided between the substrate 20 and the marking layer 22, and the change in the optical properties of the marking layer 22 can consist in producing transparent sub-areas 28 in an otherwise opaque layer, so that the information in the printing layer in these sub-areas is visible following laser irradiation.

In the alternative design in FIG. 3 is applied to a substrate 30 a sequence of layers 32 exhibiting a first layer 34 that is transparent to the laser radiation of the chosen wavelength, an absorbing layer 36 and a second laser-radiation-transparent layer 38. At least one of the absorbing or transparent layers contains optically variable color pigments. For example, the transparent layer 34 can contain liquid crystal pigments that show a reflection color that changes with the viewing angle.

The absorbing layer 36 is ablated in a sub-area 40 by laser irradiation, the transparent layer 38 lying above the absorbing layer 36 having been carried away with the latter by the ablation. If, for example, an infrared laser is used for ablation, such as a Nd:YAG laser with $\lambda$=1,064 μm, the laser-radiation-transparent layers 34, 38 can be opaque and colored in the visible spectral range. Through the form and design of the ablated area 40, manifold identifiers can be introduced into the sequence of layers 32, in which, for example, an optically variable color effect of a liquid crystal layer 34 stands out in contrast to a monochrome surrounding area of a second transparent printing layer 38.

A further exemplary embodiment of the present invention is depicted in FIG. 4. To a value document 50 is applied in an identifier area 52 a sequence of layers 54 whose layer structure is shown along line B-B of FIG. 4(*a*) in the cross-section view of FIG. 4(*b*). On the value document substrate 56 is imprinted in the identifier area a printing layer 58 that is transparent to infrared radiation, but appears dark in the visible range, and to this printing layer is applied a marking layer 60 composed of an effect ink mixture. In the exemplary embodiment, the effect ink mixture contains optically variable liquid crystal pigments 62 as the transparent mixture component and optically variable interference layer pigments 64 as the absorbing mixture component. The marking layer 60 initially shows on the entire surface, when the value document is tilted, the two-color change characteristic for optically variable pigments.

In a sub-area 66, the sequence of layers 54 was then impinged on by the infrared radiation of a Nd:YAG laser. The interference layer pigments 64 absorb the laser light and are thereby deactivated and/or removed in the sub-area 66. There, only the laser-radiation-transparent liquid crystal pigments 62 remain that show, against the dark background of the printing layer 58, the color tilt effect characteristic for liquid crystal pigments.

In general, the identifier formed by the sub-area 66 appears, when viewed at a right angle, in a first color 70 and its surroundings in a second color 72. When the value document is tilted, the liquid crystal pigments 62 produce, when viewed from an acute angle, a third color impression 74, the interference layer pigments 64 a fourth color impression 76. A particularly impressive tilt effect results when the first and fourth color 70 and 76, and the second and third color 72 and 74 are chosen to be the same, since then, the color contrast is precisely reversed when the value document is tilted. Such an effect can be achieved through suitable, coordinated choice of the liquid crystal pigments 62 and the interference layer pigments 64.

In the exemplary embodiment in FIG. 4, the information content of the identifier is given by the shape of the lasered sub-area 66. Alternatively or additionally, the printing layer 58 can be formed to bear information, as illustrated in FIG. 5. In this exemplary embodiment, the useful information 80, here the numeric string "10", is introduced into the printing layer 82 with printing technology, but is not initially visible through the opaque marking layer 60. Through impingement on the laser area 84 by the radiation of an infrared laser, the absorbing interference layer pigments 64 there are deactivated and/or removed, so that the printed information 80 is visually perceptible in the now transparent laser area 84. In this variation, the laser irradiation can be carried out across the full surface, since the useful information is produced with printing technology.

In further exemplary embodiments of the present invention, the printing-technology structuring and the laser structuring are combined to produce various register effects. For this, FIG. 6 shows, first, an exemplary embodiment having a macroscopic, that is, a large-area register effect, in FIG. 6(*a*), the identifier area 90 of a value document being depicted as viewed from above and in FIGS. 6(*b*) and 6(*c*), the layer structure of the value document and the applied sequence of layers along lines B-B and C-C of FIG. 6(*a*).

On the value document substrate 92 are printed next to one another two ink layers 94 and 96 that, when viewed from above, exhibit the same tone, but differ in their absorption behavior for the infrared laser radiation. Here, the first ink layer 94 is transparent to laser radiation, the second ink layer 96, absorbing. The two ink layers can also be structured and, for example, provided with a pattern, guilloches or microtexts. Also, additional printing layers can be disposed between the substrate 92 and the two ink layers 94, 96.

To the two ink layers 94, 96 is applied a marking layer 98 composed of an effect ink mixture containing, in the exemplary embodiment, optically variable liquid crystal pigments 100 as the transparent mixture component and metallic pigments 102 as the absorbing mixture component. If the sequence of layers is now impinged on in an identifier area 104 by infrared laser radiation, areas result that adjoin with register accuracy and have differing visual appearances.

Outside of the identifier area 104, the original sequence of layers is preserved even after laser radiation, as shown in FIG. 6(*b*). When viewed from above, the appearance there is dominated by the metallic-shimmering metallic pigments 102.

In the identifier area 104, the transparent ink layer 94 is not changed, but the effect ink mixture 98 above it is, see FIG. 6(*c*). The absorbing mixture component, the metallic pigments 102, are removed by the laser radiation so that, in these areas 106, the color tilt effect of the liquid crystal pigments 100 appear against the background of the ink layer 94.

In the irradiated area 108 of the absorbing ink layer 96, the latter is ablated together with the marking layer 98 above it by the action of the laser radiation. In this way, an absolutely exact macroscopic register is created at the borderline 110 of the absorbing ink layer 96 and the transparent ink layer 94.

A complex exemplary embodiment of the present invention having a microregister that is perceptible only under a magnifying glass will now be explained with reference to FIGS. 7 to 9. First, FIG. 7(*a*) shows the layer structure of the sequence of layers 122 applied to a light security substrate 120, prior to laser impingement. The sequence of layers 122 comprises a first laser-radiation-transparent ink layer 124, an absorbing layer 126, a second laser-radiation-transparent ink layer 128 and a marking layer 130 composed of an effect ink mixture containing, as with the exemplary embodiment in FIG. 4, optically variable liquid crystal pigments 132 and optically variable interference layer pigments 134 as the transparent and absorbing mixture components, respectively. In the present exemplary embodiment, the effect ink mixture exhibits a high proportion of liquid crystal pigments 132, so that the overall mixture has a transparent effect.

The ink layers 124, 126 and 128 are already applied as structured with printing technology, the first transparent ink layer 124 and the absorbing ink layer 126 being imprinted with a congruent structuring in the exemplary embodiment. In the visible range, the infrared-transparent ink layers 124, 128 can appear, for example, red or black. The marking layer 130 is applied across the full surface of the ink layers 124, 126 and 128.

After impingment on the sequence of layers 122 by laser radiation in a laser area 136, the situation depicted in FIG. 7(*b*) results. As already explained in connection with FIG. 4, the marking layer 130 is transformed into a transparent modification in the laser area 136 by the removal or deactivation of the interference layer pigments 134 so that, depending on the substrate, the color tilt effect of the liquid crystal pigments 132 can come to bear.

The laser radiation also passes through the transparent part of the marking layer 130 and the transparent ink layer 128 to the deeper absorbing ink layer 126. The latter is ablated by the action of the laser radiation, also carrying away with it the areas of the transparent ink layer 128 and the marking layer 130 directly above it, so that the first ink layer 124 is exposed in these areas 146.

Overall, through the laser impingement, four areas having various optical impressions are created: in the area 140 outside of the laser area 136, the two-color change effect in the interference layer pigments 134 dominates. In the adjoining area 142, the modified marking layer lies above the light security substrate 120, so that the color tilt effect is hardly visible when viewed and the area 142 appears substantially structureless and light. In the area 144, the modified marking layer is disposed above the second ink layer 128, so that the color tilt effect of the liquid crystal pigments 132 is easily perceptible here because of the dark background. In the fourth area 146, already mentioned, the red ink layer 124 is visible.

FIG. 8 shows the corresponding identifier area 150 of the value document as viewed from above, the form of the laser area 152 representing the numeric string “10” as large-area information, as depicted in FIG. 8(*a*). FIG. 8(*b*) shows a section 154 in the border region of the laser area 152, in which the microregister formed by the micro-numeric string “10” is easily perceptible. The exact structure of the identifier area 150 shown can best be understood when looked at together with FIGS. 7 and 9, the latter showing, in an exploded perspective view, the successive structured layers of the sequence of layers 122.

With reference to FIGS. 7 and 9, as the lowermost ink layer, the first, red ink layer 124 is imprinted in the form of the micro-numeric string “10” on the value document substrate not depicted in FIG. 9. On the first ink layer 124 is imprinted, congruently and likewise in the form of the micro-numeric string “10”, the absorbing ink layer 126. The second transparent ink layer 128 is imprinted with an ink that is transparent in the visible range in the form of, as can best be seen in FIG. 9, a chessboard-like pattern having small squares 156 and 158 in two different gray levels. The transparent marking layer 130 is applied to this second ink layer 128 across the full surface, the part of the laser area 152 that falls in the section 154 also being shown in FIG. 9.

After laser irradiation of the identifier 152 has occurred, the appearance shown in the section in FIG. 8(*b*) results: outside of the laser area 152, the chessboard pattern of the second ink layer 128 and the underlying dark ink layer 126 can be seen in the form of the micro-numeric string “10” through the transparent marking layer 130.

In the lasered area 152, as already explained in connection with FIG. 7, the absorbing ink layer 126 is ablated together with the second transparent ink layer 128 and the marking layer 130, so that the microtext "10" appears there in the red pigment of the first ink layer 124. As can be seen in FIG. 8(*b*), a clear and exactly register-accurate transition between the two color impressions in the micronumbering results along the borderlines 160 of the laser area. Such a microscopic register effect cannot be imitated with printing technology.

In alternative embodiments, the first transparent ink layer 124 can also be lacking. In this case, the light value document substrate itself is perceptible in the areas 146.

In the above-mentioned exemplary embodiments, for example, the following ink mixtures can be used for the effect ink mixture:

1) a mixture composed of 20% to 90% liquid crystal pigment ink (STEP®) and 10% to 80% metal layer pigment ink (OVI®), as well as 1% to 10% of another ink.

1') a mixture composed of 12.5 parts magenta/green from Sicpa (OVI®) and 25 parts of HELICONE® HC Scarabeus ink from Wacker, as well as 1.5 parts of another ink.

2) a mixture composed of 10% to 80% metal pigment ink (metal color gold and silver) and 20% to 90% liquid crystal pigment ink (STEP®).

2') a mixture composed of 4 parts of gold ink for the screen printing, from Sicpa, and 25 parts of the HELICONE® HC Maple ink from Wacker.

In the exemplary embodiments described so far, the ink mixtures or the sequences of layers are each designed such that, by the action of the laser radiation, identifiers are introduced that are visually perceptible without auxiliary means. The exemplary embodiments now explained with reference to FIGS. 10 to 13 show versions of the present invention having mechanically detectable identifiers that are not perceptible to the human eye, or only with auxiliary means.

By way of explanation, FIG. 10 shows a value document substrate 170, for example a banknote, to which a marking layer 172 composed of an ink mixture composed of two mixture components 174 and 176 is applied. One of the mixture components 174 is transparent to the radiation of the infrared laser subsequently used for marking, the other mixture component 176 absorbs the laser radiation. Here, both mixture components 174 and 176 are chosen so that their colors are not differentiable to the eye in the visible spectral range, and they appear, for example, in the same blue tone.

In the area 178, the marking layer 172 was irradiated with the marking laser with suitably chosen laser parameters to destroy or change the absorbing mixture component 176 through the action of the laser radiation. Here, the mechanism for destroying or changing the IR-absorbing material under the action of the laser beam is not significant for the present invention.

Since the two mixture components 174 and 176 do not differ visually, the lasered area 178 does not stand out from its surroundings to the naked eye when the mixture proportions are suitably chosen. The marking layer 172 thus appears to the viewer as a homogeneous, single-colored layer, as illustrated in FIG. 11(*a*), which shows the visual appearance of a corresponding section of the value document as viewed from above.

Upon irradiation of the value document with infrared radiation, however, the lasered area 178 can be read out in reflection since, due to the lack of an IR absorber there, the intensity of the reflected IR radiation in the lasered area 178 is significantly lower than in the surrounding area. This can be easily detected with an IR camera or a silicon detector. By way of example, FIG. 11(*b*) shows the same section as FIG. 11(*a*) under illumination with an IR lamp, taken with an IR camera. The value document can thus be provided with visually invisible, but mechanically easily readable individualizations that require little space on the value document and that do not substantially impact the value document design.

As shown in FIG. 11(*b*), the individualizations can especially be designed in the form of bar codes or matrix codes. The latter are preferred in the value document field, since they permit the presentation of high information content on a small area. The absorbing mixture component 176 can naturally also be only partially removed with the marking laser to obtain differing brightness levels in the reflected infrared image and to avoid visually perceptible information in the visible area.

As the ink mixture for the marking layer, a blue can be used, for example, that contains, as the IR transparent mixture component, copper phthalocyanine blue with the International Color Index name (CI) P.B. 15 or 15:3 (pigment: Cu-II phthalocyanine), and as the IR absorbing mixture component, Milori blue CI P.B. 27 (pigment: an iron-cyanide compound having the formula $Fe_4[Fe(CN)_6]_3 \times H_2O$). Particularly good results can be achieved when the proportion of the IR-transparent mixture component is larger than that of the IR-absorbing component. For example, the ratio of phthalocyanine blue and Milori blue, in relation to the inks, can be 70:30 or even 90:10.

Alternatively, for example, as the ink mixture, a green can be used that contains, as the IR-transparent mixture component, Phthalo Green CI P.G. 7 (pigment: chlorinated Cu-II phthalocyanine green, and as the IR-absorbing mixture component, chrome oxide green (chromium-III oxide hydrate).

A gray can be obtained, for example, by using diarylide yellow CI P.Y. 13, phthalocyanine blue CI P.B. 15 ($\alpha$-modification) or 15:3 ($\beta$-modification) and naphthol AS red CI P.R. 146 (pigment: monoazo pigment with 2-hydroxy-3-naphthoic acid arylides) as the IR-transparent mixture component and carbon black CI P.Bl. 7 or graphite as the IR-absorbing mixture component.

As the marking laser, for example, Nd:YAG lasers or Nd:$YVO_4$ lasers, both with $\lambda$=1,064 μm. can be employed for the cited mixtures. With the marking laser, for one thing, vectors, that is, polylines, can be inscribed in the sequence of layers, which is advantageous above all for fast inscriptions, like those needed in the print shop environment. For another thing, the marking laser can also be operated in a raster mode, in which the laser beam scans the substrate surface and the laser output is activated specifically at those grid points at which a lasering should occur. This version is advantageous above all for illustrating and inscribing cards or data pages of passports.

FIG. 12 shows a version according to a further exemplary embodiment of the present invention. In the design in FIG. 12, there is present on the security substrate 180 a sequence of layers 182 in which an IR-absorbing layer 186 is disposed above an IR-transparent layer 184, the absorbing layer and the transparent layer appearing in the same tone in the visible spectral range. The two layers can especially be imprinted on the substrate 180 with printing inks having the pigments cited in connection with FIG. 10.

Through laser irradiation with an infrared laser, an identifier 188 is introduced into the IR-absorbing layer 186, for example through chemical change or destruction of the IR-absorbing pigments or ablation of the layer or pigments. However, the underlying IR-transparent layer 184 is not changed by the laser radiation. Since the two layers have the same tone in the visible spectral range, the sequence of layers 182 appears to the viewer as a uniform colored surface, also after laser labeling. As described above, the identifier can be read out upon irradiation of the value document with IR-radiation based on the lower reflectivity in the area 178.

A further version of the present invention is depicted in FIG. 13. In this exemplary embodiment, an IR-absorbing layer 196 is applied to a security substrate 190 of the same tone, so that an identifier 198 inscribed with a laser does not appear visually. The identifier 198 attracts attention, as in FIGS. 10 to 12, merely in the infrared spectral range, due to the lower reflectivity, and can thus be read out mechanically.

Instead of visually visible pigments, upconversion pigments can also be used (e.g. UC2 from Honeywell, rare earth oxysulfide).

Instead of the infrared codes described, other identifiers that are not visually perceptible, or only with auxiliary means, can also be employed. For example, a UV code can be inscribed in an orange labeling layer 172 (FIG. 10) that contains disazo pyrazolone orange CI P.O. 34 as the UV-transparent mixture component and perinone orange CI P.O. 43 as the UV-absorbing component. Here, a UV laser with $\lambda$=321 nm is used as the marking laser, and the readout of the identifier occurs through a measurement of the UV reflection of the value document surface, or of the fluorescence of P.O. 43 following excitation with UV light.

Moreover, visually invisible luminescent inks that fluoresce or phosphoresce following excitation with UV light and thus become perceptible only through the auxiliary means of a UV excitation source can also be used. Various luminescent substances can also be combined with one another. Here, above all organic pigments, as well as many inorganic pigments, may be used as the luminescent substances.

The invention claimed is:

1. A value document, especially a banknote, having a substrate and a sequence of layers on the substrate, the sequence of layers comprising visually and/or mechanically perceptible identifiers in the form of patterns, letters, numbers or images introduced by the action of laser radiation, characterized in that the sequence of layers contains a marking layer composed of an ink mixture containing optically variable color pigments and comprising a laser-radiation-absorbing mixture component and a laser-radiation-transparent mixture component, wherein the laser-radiation-absorbing mixture component comprises optically variable interference layer pigments and wherein the laser-radiation-transparent mixture component comprises optically variable liquid crystal pigments, the identifiers being visually and/or mechanically perceptible due to an irreversible change in the optical properties of the ink mixture, the irreversible change effected by the action of the laser radiation.

2. The value document according to claim 1, characterized in that the introduced identifiers are visually perceptible without auxiliary means.

3. The value document according to claim 1, characterized in that the sequence of layers comprises at least one laser-radiation-absorbing layer, which is disposed between the marking layer and the substrate of the value document.

4. The value document according to claim 1, characterized in that the sequence of layers comprises at least one laser-radiation-absorbing layer and at least one laser-radiation-transparent layer, which are disposed between the marking layer and the substrate of the value document.

5. The value document according to claim 4, characterized in that a laser-radiation-transparent layer is disposed between the absorbing layer and the marking layer.

6. The value document according to claim 4, characterized in that a laser-radiation-transparent layer is disposed between the absorbing layer and the substrate of the value document.

7. The value document according to claim 3, characterized in that the absorbing layer comprises an information-bearing structure.

8. The value document according to claim 4, characterized in that the laser-radiation-transparent layer comprises an information-bearing structure.

9. The value document according to claim 7, characterized in that the information-bearing structure is at least partially produced with printing technology.

10. The value document according to claim 7, characterized in that the information-bearing structure is at least partially produced by the action of the laser radiation, especially by a selective ablation of the absorbing layer.

11. The value document according to claim 1, characterized in that the sequence of layers contains, in addition to the marking layer, an additional layer composed of an ink mixture comprising a laser-radiation-absorbing mixture component and a laser-radiation-transparent mixture component, the additional ink mixture layer being disposed between the marking layer and the substrate of the value document.

12. The value document according to claim 11, characterized in that the additional ink mixture layer comprises an ink mixture containing optically variable color pigments and comprising a laser-radiation-absorbing mixture component and a laser-radiation-transparent mixture component.

13. The value document according to claim 11, characterized in that the additional ink mixture layer comprises an information-bearing structure.

14. The value document according to claim 7 characterized in that the information-bearing structure forms at least part of the identifiers and is visually perceptible due to the irreversible change in the optical properties of the ink mixture.

15. The value document of claim 1, wherein the identifiers are mechanically perceptible and wherein the identifiers are not visually perceptible or not visually perceptible without auxiliary means.

16. The value document according to claim 15, characterized in that the introduced identifiers are perceptible in the infrared spectral range.

17. The value document according to claim 15, characterized in that the introduced identifiers are perceptible following irradiation with ultraviolet radiation.

18. The value document according to claim 15, characterized in that the absorbing mixture component and the transparent mixture component appear in the same tone in the visible spectral range.

19. The value document according to claim 18, characterized in that the ink mixture visually exhibits a hue that differs from black.

20. The value document according to claim 15, characterized in that the proportion of the transparent mixture component outweighs the proportion of the absorbing mixture component in the ink mixture.

21. The value document according claim 20, characterized in that the transparent mixture component in the ink mixture comprises a proportion of 60% or more.

22. The value document of claim 20, characterized in that the transparent mixture component in the ink mixture comprises a proportion of 70% or more.

23. The value document according to claim 1, characterized in that the identifiers comprise an individualization mark, such as a sequential serial number, a symbol code, such as a bar or matrix code, or the like.

24. A security element for value documents, especially banknotes, having a sequence of layers into which visually and/or mechanically perceptible identifiers in the form of patterns, letters, numbers or images are introduced by the action of laser radiation, characterized in that the sequence of layers contains a marking layer composed of an ink mixture containing optically variable color pigments and comprising a laser-radiation-absorbing mixture component and a laser-radiation-transparent mixture component, wherein the laser-radiation-absorbing mixture component comprises optically variable interference layer pigments and wherein the laser-radiation-transparent mixture component comprises optically variable liquid crystal pigments, the identifiers being visually and/or mechanically perceptible due to an irreversible change in the optical properties of the ink mixture, the irreversible change effected by the action of the laser radiation.

25. The security element according to claim 24, characterized in that the introduced identifiers are visually perceptible without auxiliary means.

26. The security element of claim 24 wherein the identifiers are mechanically perceptible, and wherein the identifiers are either not visually perceptible or not visually perceptible without auxiliary means.

27. The security element according to claim 26, characterized in that the sequence of layers is formed with introduced identifiers that are perceptible in the infrared spectral range, are perceptible following irradiation with ultraviolet radiation.

28. The value document according to claim 22, characterized in that the transparent mixture component in the ink mixture comprises a proportion of 80% or more.

* * * * *